Nov. 12, 1957  H. L. SETZ  2,812,936
TORSIONAL MEMBER
Filed Aug. 29, 1956
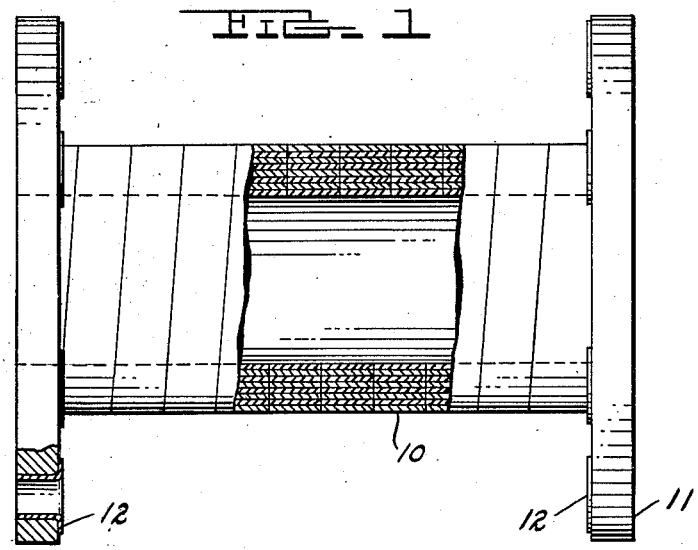
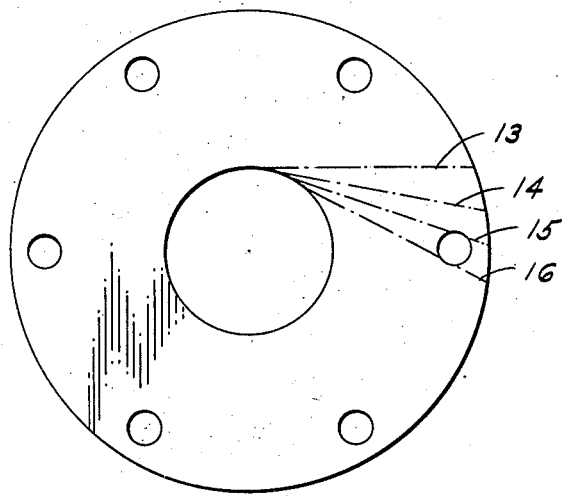
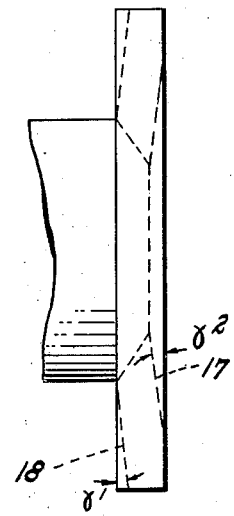
H. SETZ
INVENTOR.
E. C. McRAE
BY  J. R. FAULKNER
T. H. OSTER
ATTORNEYS United States Patent Office 2,812,936
Patented Nov. 12, 1957

2,812,936
TORSIONAL MEMBER

Henry L. Setz, Franklin Village, Mich., assignor to Ford Motor Company, Dearborn, Mich., a corporation of Delaware Application August 29, 1956, Serial No. 606,898

4 Claims. (Cl. 267—1)

This invention relates to a structure useful in elastically storing large amounts of energy and more particularly it is concerned with a device in which such storage is accomplished essentially in unidirectional strands or elements of glass or similar nonmetallic elastic fibers.

It has been found that on a weight basis the energy storable in properly designed glass fiber spring members compares favorably and in many instances is superior to the best available metallic springs.

While not so limited this invention is particularly adaptable to the production of torsional springs and is so depicted in the figures of drawing in which, Figure 1 is a drawing partially in section of a completed torsional spring fabricated according to this invention, and, Figure 2 is a view taken axially of the flange end of the spring, and, Figure 3 is a similar view of the flange end taken radially.

There is now commercially available the so-called reinforced plastic glass tapes which are essentially a large number of unidirectional glass fibers secured in the form of a tape by a coating of an uncured or partially cured resinous material. The axes of the glass fibers are all essentially parallel to the long direction of the tape. While any suitable resin may be used to bond the fibers, epoxy resins have been found to be particularly desirable for this purpose.

Referring to Figure 1 of the drawing, there is shown a torsional spring comprising a body 10 terminating at each end in flanges 11 in which may be placed bushings 12 for fastening purposes. As an example of dimensions suitable for an actual spring this structure has been designed with an over-all length of 7 inches and a flange diameter of 6 inches. Body 10 is in the form of a hollow cylinder having an outside diameter of approximately 3 inches and an inside diameter of approximately 2 inches. Body 10 comprises 30 separate and distinct layers of glass reinforced plastic tape wound upon a mandrel in the form of alternating left and right hand helices.

It is important in the design and manufacture of a spring of this type to secure a uniform loading either in compression or tension of all of the glass fibers to prevent undesirable load concentrations with their concomitant design and functional limitations.

In the actual design of such a spring the angle of the inner helix is chosen to give approximately the desired physical properties. Having assumed this helical angle and having shown a definite thickness of tape, the helical angle for each succeeding layer may be calculated from the formula $$S = \frac{\theta E \Pi D \tan \alpha}{360 L}$$

In this formula S is equal to the average tensile or compressive stress in the glass fiber expressed in pounds per square inch. Theta is equal to the angular deflection of the spring. E is Young's modulus or the modulus of elasticity of the glass fiber expressed in pounds per square inch. D is equal to the fiber helical coil diameter expressed in inches. $\alpha$ is equal to the helix angle expressed in degrees. L is equal to the active length of the spring expressed in inches. Substituting appropriate values in this formula and assuming an inner helical angle of 5 degrees and 35 minutes, the angle of each helical layer progressively decreases to a value of 3 degrees and 32 minutes on the outer layer. By this expedient a substantially uniform stressing of the glass fibers is secured in the preferred structure. The width of the tape will vary from layer to layer to secure in each layer a tape width equal to the helical lead.

In the above descriptions the layers of glass reinforced tape have been treated as individual layers and so calculated. In actual practice it is desirable to think of a spring of this type as composed of a series of successive layers, each layer comprising a right and left hand helix. Each of these individual layers will have no tendency either to bulge or collapse since the substantially equal tensile and compressive stress in the two layers substantially neutralize each other. Accordingly the two inner layers, one left hand and one right hand would have the same helical angle as would each succeeding pair of layers. The tape employed in the preferred structure has a thickness of approximately 0.017 of an inch. However, inherently any structure of this type in practice must represent a compromise between very thin layers and a reasonable number of layers practicable for construction purposes.

Figures 2 and 3 have been added to demonstrate the technique to be followed in securing the individual tapes into the flange to avoid disastrous concentration of stress in the fibers at the fillets.

Considering Figure 2, this drawing shows the disposition in one plane of the end of a single layer of tape. It is preferred to split the ends of the tape into a large number of parallel flagella and to dispose each of these flagella in a line which represents a continuation of a tangent to body 10 at the point at which the individual flagella departs from body 10. For example Figure 2 lines 13, 14, 15 and 16 represent respectively the four successive paths of the four flagella into which a single tape has been split. Line 13 represents the outer flagella and hence would intersect the plane of the flange first. Line 14 would be established when the next succeeding flagellum intersects the flange.

In Figure 3, lines 17 and 18 have been added to depict the limits within which the flagella from the fibers should be confined to avoid stress concentration at the fillet. Line 17 and the upper surface of the flange define angle $\gamma_2$. Similarly line 18 and the lower surface of the flange define angle $\gamma_1$. These angles are derived from the following formulae:

$$\gamma_1 = \arctan\left(\frac{\sqrt{R_3^2 - R_2^2}}{R_3 - R_2} \tan \alpha_1\right)$$

$$\gamma_2 = \arctan\left(\frac{\sqrt{R_3^2 - R_1^2}}{R_3 - R_1} \tan \alpha_2\right)$$

In this expression $R_1$ is the radius of the inner helix, $R_2$ the radius of the outer and $R_3$ the outer radius of the flange. It is obvious that the volume of fibers in the body 10 will be inadequate to completely fill the volume of the flange with the rectangular shape shown in section. At best, filler will have to be supplied for all of the material outside of the solid revolution defined by lines 17 and 18. A certain amount of filler will also have to be supplied within the solid of revolution described by lines 17 and 18 to obtain the requisite density. A consideration of this type of flange construction with adjacent opposite helices will show that the strands cut to provide space for bushings 12 will intersect such holes at a large number of angles and will approach an isotropic condition.

It is to be understood that $\gamma_1$ corresponds to the outside helix and $\gamma_2$ the inside helix and that a separate $\gamma$ will have to be provided for each of the individual layers or pairs of lines by substituting a general R for the specific $R_1$ or $R_2$ as the case may be in the formula given for $\gamma_1$ or $\gamma_2$.

I claim as my invention:

1. A device for the elastic storage of torsional energy, said device being in the form of a holow cylinder comprising a plurality of successive and superimposed pairs of layers of non-metallic elastic fiber reenforced plastic tape wound as helices, each of said pairs comprising a layer which is a right hand helix and a left hand helix and having the same helical angle, the helical angle of said pairs of layers progressively decreasing from the inner to the outer layers, said alternate left and right hand helices serving to cause the compressive and tensile stresses to approximately neutralize each other.

2. A device for the elastic storage of torsional energy, said device being in the form of a hollow cylinder comprising a plurality of successive and superimposed pairs of layers of non-metallic elastic fiber reenforced plastic tape wound as helices, each of said pairs comprising a layer which is a right hand helix and a left hand helix and having the same helical angle, the helical angle of said pairs of layers progressively decreasing from the inner to the outer layers, the progressive change in helix angle from layer to layer serving to equalize the stress throughout the elastic fibers, said alternate left and right hand helices serving to cause the compressive and tensile stresses to approximately neutralize each other.

3. A device for the elastic storage of torsional energy, said device being in the form of a hollow cylinder comprising a plurality of successive and superimposed layers of non-metallic elastic fiber reenforced plastic tape wound as helices, the helical angle of said layers progressively decreasing from the inner to the outer layers and said layers being wound as alternate left and right hand helices so that the compressive stress tending to collapse the cylinder approximately neutralizes the tensile stress tending to bulge the cylinder, said cylinder terminating in at least one integral flange, said flange incorporating continuations of the helically wound tape, said tape being tangent to the cylinder at its point of departure from the cylinder and comprising a continuation of said tangent in the flange whereby stress concentration in the fillet between the cylinder and flange is avoided.

4. A device for the elastic storage of torsional energy, said device being in the form of a hollow cylinder comprising a plurality of successive and superimposed layers of non-metallic elastic fiber reenforced plastic tape wound as helices, the helical angle of said layers progressively decreasing from the inner to the outer layers and said layers being wound as alternate left and right hand helices so that the compressive stress tending to collapse the cylinders approximately neutralizes the tensile stress tending to bulge the cylinder, the width of the tape in each layer being approximately equal to the helical pitch, each layer being terminated in continuations to form an enlarged end portion in which the continuations of each layer cover equal angular segments of said enlarged end portion.

References Cited in the file of this patent

UNITED STATES PATENTS

| | | |
|---|---|---|
| 177,490 | Fones et al. | May 16, 1876 |
| 633,328 | Roberts | Sept. 19, 1899 |
| 2,573,361 | Rodgers et al. | Oct. 30, 1951 |